(12) United States Patent
Lepoutre

(10) Patent No.: US 6,386,316 B1
(45) Date of Patent: May 14, 2002

(54) DEVICE FOR CONTROLLING THE POROSITY OF A HELICAL, FLEXIBLE, SOUND-ABSORBING AIR-CONDUCTING TUBE

(76) Inventor: Edmond Pol Jean Lepoutre, Rne N°W 007269-Z, 133 Rua David Abraao, Curitiba-Parana (BR)

( * ) Notice: Subject to any disclaimer, the term of this patent is extended or adjusted under 35 U.S.C. 154(b) by 0 days.

(21) Appl. No.: 09/550,689

(22) Filed: Apr. 17, 2000

(30) Foreign Application Priority Data

Apr. 20, 1999 (BR) .............................................. 9900914

(51) Int. Cl.$^7$ ................................................ E04F 17/04
(52) U.S. Cl. ........................ 181/224; 181/222; 181/741
(58) Field of Search ................................. 181/222, 224, 181/241

(56) References Cited

U.S. PATENT DOCUMENTS

| 3,937,590 A | * | 2/1976 | Mani | 415/119 |
| 4,410,065 A | * | 10/1983 | Harvey | 181/224 |
| 4,824,322 A | * | 4/1989 | Middleton | 415/53 |
| 5,607,529 A | * | 3/1997 | Adamczyk et al. | 156/143 |
| 5,947,158 A | * | 9/1999 | Gross et al. | 138/149 |
| 6,062,270 A | * | 5/2000 | Hultberg et al. | 138/139 |
| 6,202,702 B1 | * | 3/2001 | Ohira et al. | 138/149 |
| 6,237,642 B1 | * | 5/2001 | Lepoutre | 138/129 |

* cited by examiner

Primary Examiner—Paul Ip
Assistant Examiner—Kim Lockett
(74) Attorney, Agent, or Firm—Darby & Darby

(57) ABSTRACT

Device for controlling the porosity of a helical, flexible, sound-absorbing, air-conducting tube; the present patent relates to a device comprised of a variable-width, non-porous film strip (2) helically arranged in a discontinued manner between the external layer or lining (1), formed of a helical strip of porous material (1-A) and the inner, cylindrical layer or lining (3), formed of a helical strip of porous material (3A0 of a flexible, cylindrical tube, the film strip (2) being intended to control the porous strips (5) of the tube wall and determining, by reason of the width of said film strip (2), a non porous strip (4) on the tube wall, with a consequent control of the acoustic attenuation.

6 Claims, 1 Drawing Sheet

DEVICE FOR CONTROLLING THE POROSITY OF A HELICAL, FLEXIBLE, SOUND-ABSORBING AIR-CONDUCTING TUBE

BACKGROUND OF THE INVENTION

1. Field of the Invention

The present invention refers to a helical, flexible, sound-absorbing tube including a non-porous, variable-width film interposed between porous helical tapes that form the walls of the tube such as to regulate the porosity of the tube.

2. Description of Related Art

Those skilled in the art are aware that the acoustic attenuation phenomenon in a a tube is due to absorption by the porous walls of the tube of the sound waves propagated by air condition inside the tube. The walls of the tube acts as a trap that capture and transform the sound waves into heat.

Accordingly, by controlling the tube wall porosity one can control the acoustical attenuation.

Currently, flexible tubes for conducting air are employed in several industries, such as the automotive industry. The tubes are manufactured by braiding or weaving threads over metallic or non-metallic supports. These flexible tubes, by reason of their construction, prevent the excessive propagation of mechanical noises. However, the process used to manufacture such flexible tubes is relatively slow and, accordingly, of a relatively high cost, resulting from the manufacturer having to deal with several product treatments in order to obtain the desired construction. There is also a similar manufacturing process employing the overlaying and gluing of porous strips over a helical support of metallic or non-metallic wire. The sound-absorption qualities of said tubes are obtained by spraying a varnish or the like over the tubes, that externally and partially obstructs the porosity attained in the construction of those tubes.

Also in the current international technology there are flexible, air-conducting tubes manufactured by the helical overlaying of uniform strips, wave-shaped or not, made of several materials, that can be glued or heat-adhered to each other, noting that said uniform strips are made of metallic material, plastic material of composite fibrous material and that the manufacturing process for these flexible tubes is quick, the strength and hermetical features of each flexible tube taking place by the helical overlay of the uniform strips. However, this type of tube tends to allow the excessive propagation of mechanical noises. Some of those tubes employ porous strips of cotton textile or the like, non-woven textile, such as non woven polyester textile or filter porous paper, noting that said porous strips are glued over a perforated metallic or non-metallic strip that serves as a support, thereby causing an acoustic attenuation effect. The acoustic control is determined by the size of the perforations on said support and also by the composition of the porous strips.

All tubes constructed as described above have the drawback of an acoustic control of difficult industrial application, since that, in respect of the first mentioned tubes, the uniform application of the varnish or the like is difficult to control and, in respect of the latter tubes, the exact dimensioning of the perforations on the support is very difficult to obtain, because the tools making such perforations must be constantly redimensioned and changed, depending on the desired sound-absorption effect.

The device for controlling the porosity of an air-conducting, helical flexible sound absorbing tube subject matter of the present patent has been designed to solve the inconveniences and drawbacks described on the report on the state of the art; accordingly, the proposed device is a variable-width, non-porous film which, by means of its helical and discontinued arrangement interposed between the porous layers along a tube allows the accurate control of the porous strips on the wall of said tube, thereby permitting an exact repeatability of the sound absorbing characteristics in the manufacture of the tube and also providing a great ease in the serial manufacture of the tube. Therefore, the scope of this patent complies with the aspects of novelty, inventive activity and industrial application. It should be noted that the proposed device, by reason of its own or aggregated characteristics, allows the industrial manufacture of the pipe, by means of the helical gluing of the porous strips to each other.

BRIEF DESCRIPTION OF THE DRAWINGS

The present patent can be best understood in the light of the annexed drawings and comments thereon, viz..

DESCRIPTION OF THE PREFERRED EMBODIMENTS

Figure 1:
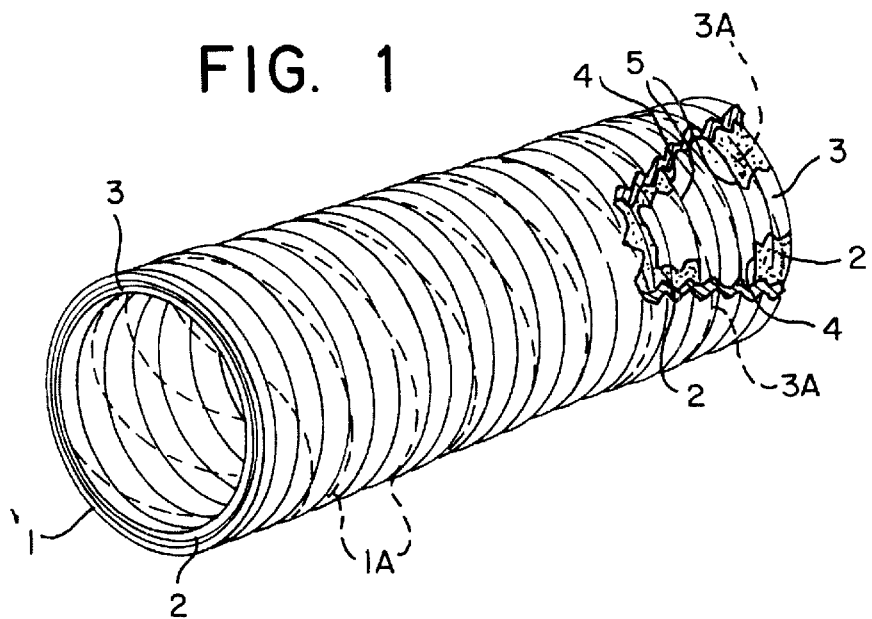
FIG. 1 is a perspective view in cross-section of an air-conducting, cylindrical, helical, flexible sound absorbing tube, comprised of the porosity control device which is helically interposed in a discontinued manner between an external and an internal lining, both being cylindrical and flexible.
Figure 2:
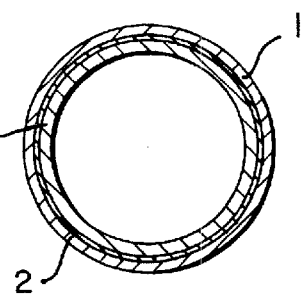
FIG. 2 is a cross-section view of the tube shown on FIG. 1.
Figure 3:
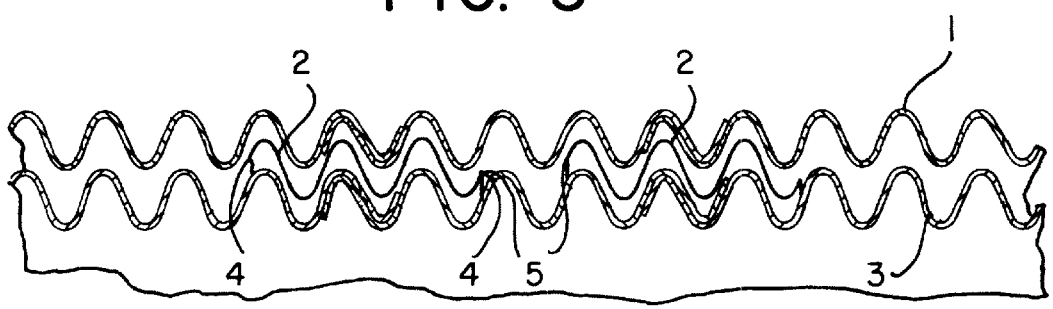
FIG. 3 is a cross-section view of a portion of the wall of the tube shown on FIG. 1.

As shown on FIGS. 1, 2 and 3 and as previously mentioned, the porosity control device is comprised of a variable-width, non-porous film strip (2) which by its helical and discontinued arrangement interposed between the outer cylindrical layer or lining (1) comprised of a helical strip of porous material (1-A) and the internal layer (3), comprised of a helical strip of porous material (3-A) allows the control of the porous strips (5) of the wall of said tube, noting that the film strip (2) determines by reason of its width or arrangement a non-porous strip (4) on the tube wall.

It should be noted that the regular discontinuity of the porous strips (5) and non-porous strips (4) along the tube, by means of their interactive proportions, allow the attenuation of preestablished sound frequencies, thereby allowing the elimination of inconvenient, noisy sound ranges.

The porosity control device subject matter of this patent was specifically designed to meet the technical requirements of attenuation of noise in air conduction, that specify which are the frequencies that should be eliminated by given successions of porous strips along a tube. By way of example, in the automotive industry certain motorization technicians request the dimensioning of the porous strips to attenuate the second, fourth and sixth-order air intake noises, which correspond to the ranges of unpleasant noises and that prevent the acoustic comfort inside a vehicle.

The porosity control device, that is, the variable-width, non-porous film (2) may be heat-glued or otherwise, and may be rigid and moldable or otherwise, serving for the gluing of porous strips or not.

The distance between the helices of the controlling strip of non-porous film (2) subject matter of the present patent, as well as the width of this film strip (2) allow the exact control of the tube porosity.

What is claimed is:

1. A helical, flexible, sound-absorbing, air-conducting tube having a wall, comprising:
   an external cylindrical layer formed by a helical strip of porous material;
   an internal cylindrical layer formed of a helical strip of porous material; and
   a variable-width, non-porous film strip helically arranged in a discontinued manner between said external cylindrical layer and said internal cylindrical layer.

2. A tube in accordance with claim 1, wherein said non-porous film strip is adapted for controlling porous strips of said wall and based on its width determines a non-porous strip on said wall.

3. A tube in accordance with claim 1, wherein said non-porous film strip is at least one of adherable, gluable, heat-gluable, rigid and moldable.

4. A tube in accordance with claim 1, wherein at least one of a distance between helices of said non-porous film strip and a width of said non-porous film strip control the porosity of said tube.

5. A tube in accordance with claim 1, wherein said tube is used in an air conduction for an automobile.

6. A device in accordance with claim 1, wherein said external cylindrical layer, said internal cylindrical layer, and said variable-width, non-porous film strip have a sinuous longitudinal cross section.

* * * * *